Figure 1:
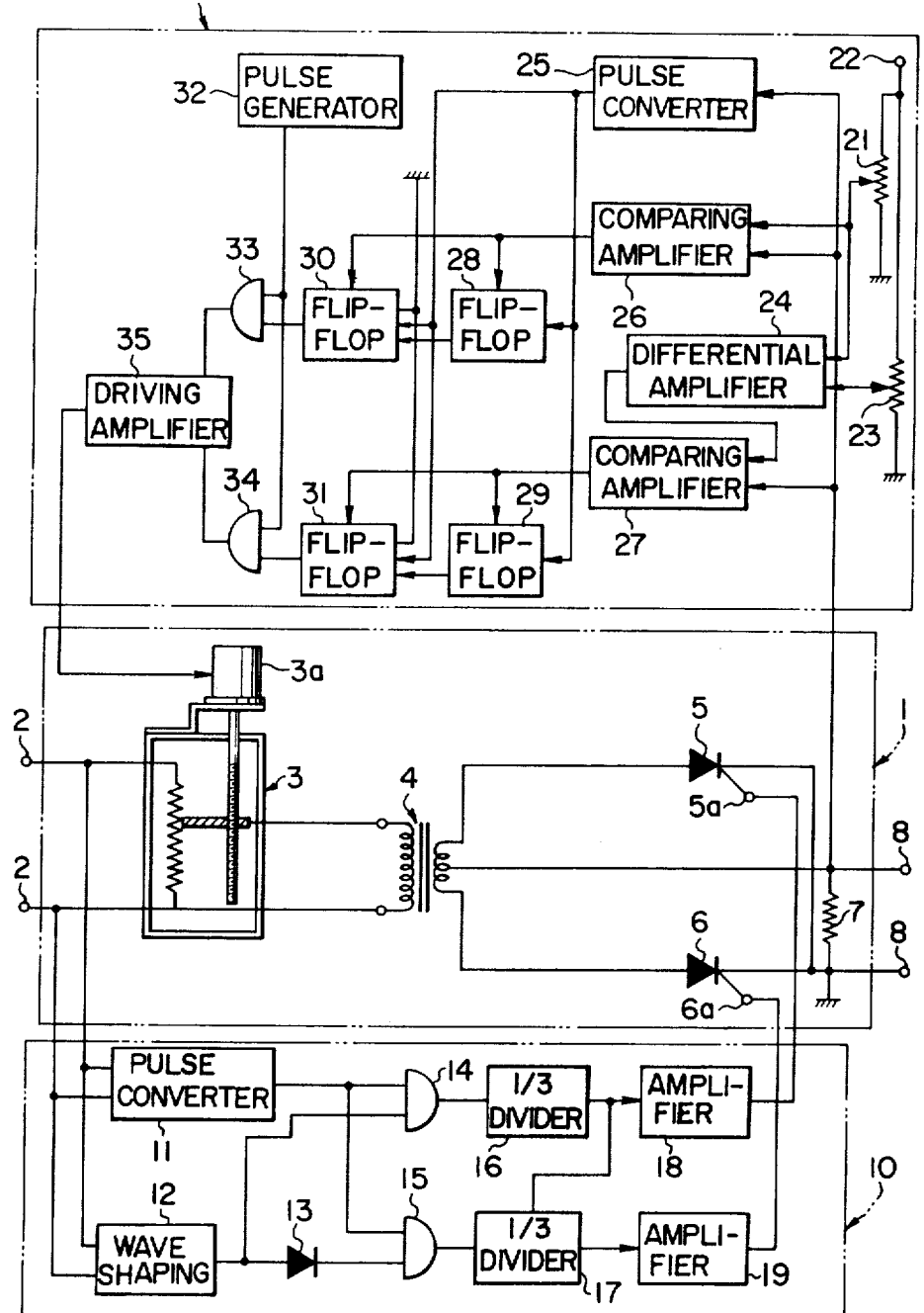

United States Patent

Mizuhara et al.

[11] 3,883,793
[45] May 13, 1975

[54] POWER SUPPLY SYSTEM FOR ELECTROLYTIC GRINDING APPARATUS

[75] Inventors: Yasushi Mizuhara, Kamakura; Yasuo Suzuki, Yokohama, all of Japan

[73] Assignee: Hitachi Seiko Ltd., Japan

[22] Filed: July 27, 1973

[21] Appl. No.: 383,050

[30] Foreign Application Priority Data
July 31, 1972 Japan................................ 47-76001

[52] U.S. Cl. ........ 321/18; 204/129.25; 204/129.46; 219/69 C; 321/47; 323/22 SC; 323/45
[51] Int. Cl. ............................................. B23p 1/04
[58] Field of Search............ 51/DIG. 9; 204/129.25, 204/129.46; 321/16, 18, 25, 47; 323/2, 22 SC, 43.5 R, 43.5 S, 45, 47, 100; 219/69 C

[56] References Cited
UNITED STATES PATENTS

| | | |
|---|---|---|
| 2,093,197 | 9/1937 | Kern .................................... 321/18 |
| 2,438,941 | 4/1948 | Peters et al. ...................... 51/DIG. 9 |
| 2,573,744 | 11/1951 | Trucksess ............................. 323/2 |
| 2,907,403 | 10/1959 | Foley ............................ 321/18 UX |
| 3,468,775 | 9/1969 | Lanning et al................. 204/129.25 |

*Primary Examiner*—A. D. Pellinen
*Attorney, Agent, or Firm*—Craig & Antonelli

[57] ABSTRACT

A power supply system for use in an electrolytic grinding apparatus comprising a rectifying circuit, a phase number reducing circuit connected to the rectifying circuit for converting an a.c. voltage into a working voltage having a pulsating waveform of a repetition frequency no higher than that of the single-phase half-wave rectified waveform of the a.c. voltage, and a working voltage control circuit connected to the rectifying circuit for controlling the peak value of the working voltage to a predetermined constant value thereby improving the precision of grinding and surface roughness of workpieces.

7 Claims, 3 Drawing Figures

3,883,793

POWER SUPPLY SYSTEM FOR ELECTROLYTIC GRINDING APPARATUS

This invention relates to a power supply system for use in an electrolytic grinding apparatus.

In one type of power supply system proposed hitherto for use in electrolytic grinding apparatus, a three-phase a.c. voltage or single-phase a.c. voltage is subject to full-wave rectification by a diode for obtaining a working voltage of pulsating waveform. With such a pulsating voltage waveform supplied from the power supply system of the type above described, a variation occurs in the current flowing between an electrode and a workpiece with the change in the area of the workpiece being ground, that is, the area of the workpiece opposite to the electrode during grinding operation, and this results in a variation of the mean voltage applied across the electrode and the workpiece. This variation of the mean voltage across the electrode and the workpiece is undesirable in that the precision of grinding is extremely degraded.

Another type of power supply system proposed hitherto employs a voltage waveform obtained by rectifying an a.c. voltage by a controlled rectifier element such as a silicon controlled rectifier. In the power supply system of the latter type, the firing angle of the controlled rectifier element is varied in response to variations of the current flowing between an electrode and a workpiece so that the mean voltage across the electrode and the workpiece may not fluctuate. In such a power supply system, however, a high peak voltage level is generally employed so that, when the mean voltage across the electrode and the workpiece is varied due to variations of the current level flowing between the electrode and the workpiece, the firing angle of the controlled rectifier element can be controlled within the range of 60° to 120° so as to reliably eliminate undesirable fluctuations of the mean voltage. Thus, spark discharge tends to occur across the electrode and the workpiece through the medium of sludge produced due to removal of material from the workpiece, and the workpiece tends to be excessively ground more than is required, resulting in extreme reduction of the precision of grinding.

It will be seen that the electrolytic grinding apparatus using such prior art power supply systems have been defective in that the precision of grinding is adversely affected by the working voltage waveform. The precision of grinding and roughness of the ground surface have been of the order of ±0.02 to ±0.04 mm and 4 to 5 μ at the best even when other grinding conditions, for example, the electrolyte composition, temperature and rotating speed of the grinding wheel are varied.

It is therefore a primary object of the present invention to provide a novel and improved power supply system for use in an electrolytic grinding apparatus in which the peak value of working voltage applied across an electrode and a workpiece is maintained at a predetermined constant level and the working voltage has a pulsating waveform of a repetition frequency no higher than that of a single-phase half-wave rectified waveform of an applied a.c. voltage so as to improve the precision of grinding on the workpiece.

In accordance with one aspect of the present invention which attains the above object, there is provided a power supply system for use in an electrolytic grinding apparatus comprising a power supply circuit, a phase number reducing circuit for controlling the power supply circuit so that the output of the power supply circuit, which has a pulsating waveform, has a repetition frequency no higher than that of a single-phase half-wave rectified waveform of an applied a.c. source voltage controlling the peak value of the output of said power supply circuit to a predetermined level.

Figure 2:
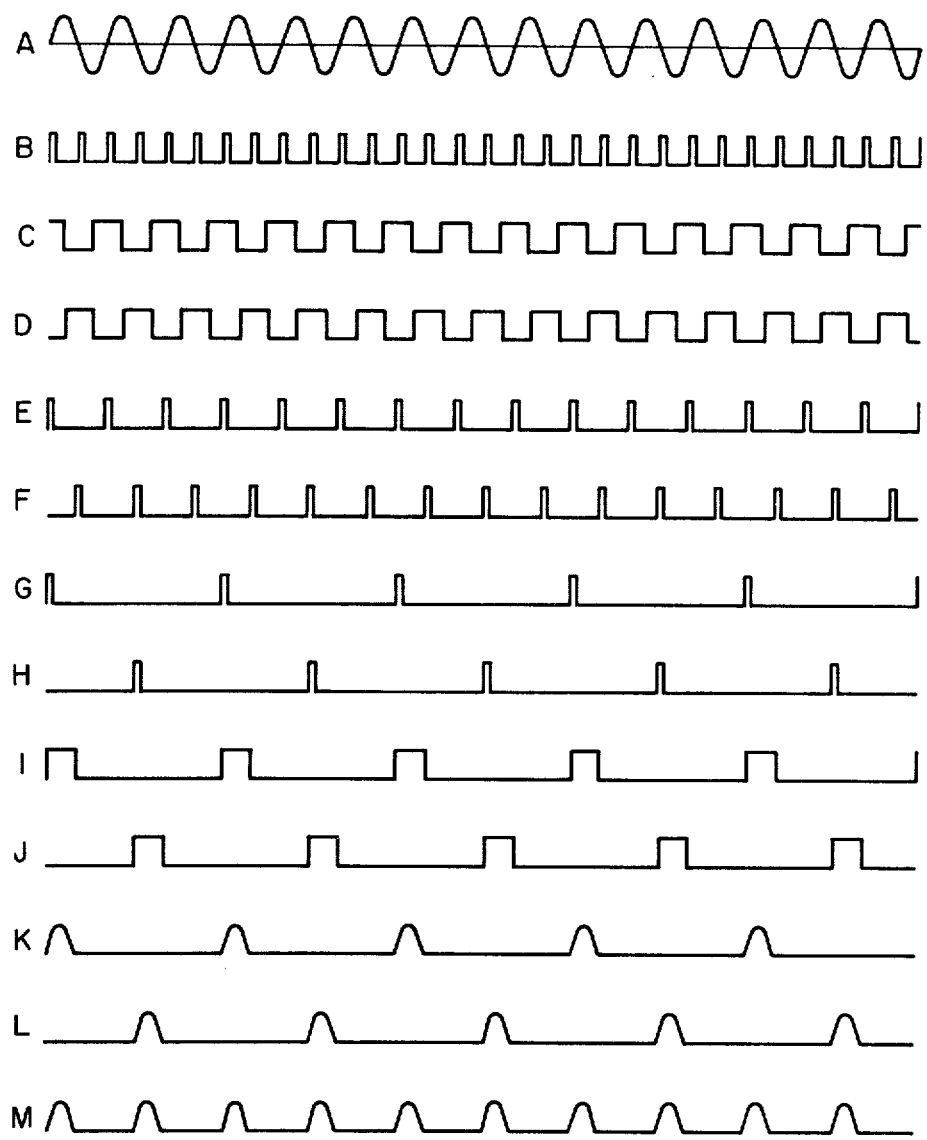
Figure 3:
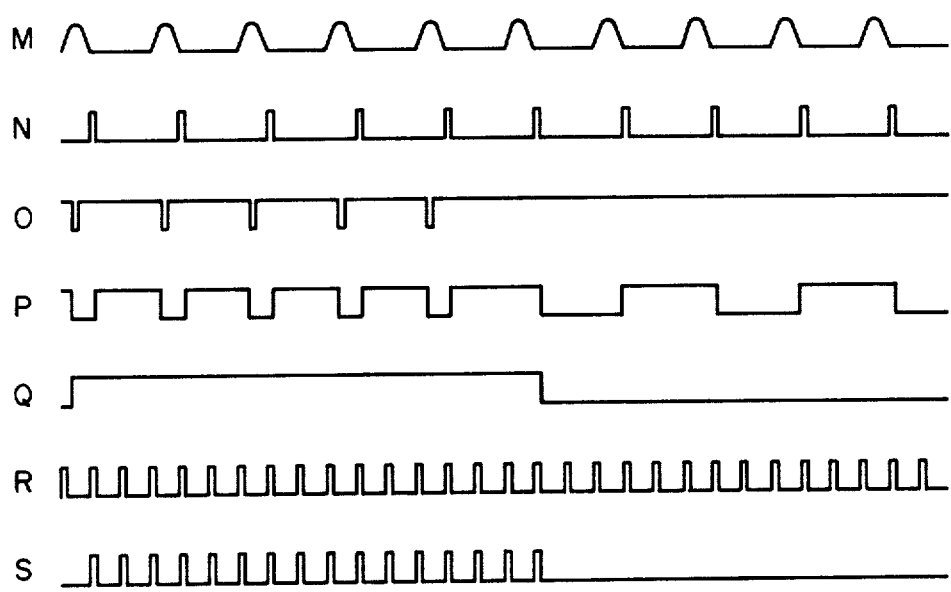

Other objects, features and advantages of the present invention will be apparent from the following detailed description of a preferred embodiment thereof taken in conjunction with the accompanying drawing, in which:

FIG. 1 is a block diagram of a power supply system according to the present invention; and FIGS. 2 and 3 show waveforms of pulses appearing at various parts of the power supply system shown in FIG. 1.

Referring to FIG. 1 showing a preferred embodiment of the present invention, a power supply circuit 1 comprises a slide regulator 3 having a pulse motor 3a of primary transformation of an a.c. voltage having a commercial frequency applied to input terminals 2, a transformer 4 for transforming the output of the slide regulator 3 into a working voltage, a pair of rectifier elements 5 and 6 having respective gate terminals 5a and 6a, and a dummy load 7. The output of the power supply circuit 1 appears across output terminals 8.

A phase reducing circuit 10 comprises a pulse converter 11 for converting the a.c. input into a train of pulses, a wave shaper 12 for shaping the a.c. input into a rectangular waveform, an inverter 13 for inverting the output of the wave shaper 12, an AND gate 14 connected to the output terminals of the pulse converter 11 and wave shaper 12, another AND gate 15 connected to the output terminals of the pulse converter 11 and inverter 13, a pair of 1:n pulse dividers 16 and 17 for dividing the number of pulses appearing from the AND gates 14 and 15 into 1/n of the original number respectively, and a pair of pulse amplifiers 18 and 19 for amplifying the pulse output of the 1:n pulse dividers 16 and 17 and applying same to the gate terminals 5a and 6a of the rectifier elements 5 and 6 as a gating signal respectively.

A working voltage control circuit 20 comprises a resistor 21 for deriving a desired reference voltage from an input applied to an input terminal 22, another resistor 23 connected in parallel with the resistor 21 for providing a dead zone in the reference voltage established by the resistor 21 and input terminal 22, a differential amplifier 24 for delivering a voltage representative of the difference between the voltages established by the resistors 21 and 23, a pulse converter 25 for converting a train of pulses on the basis of the output waveform of the power supply circuit 1, a comparing amplifier 26 for comparing the output voltage of the power supply circuit 1 with the reference voltage applied from the resistor 21, another comparing amplifier 27 for comparing the output voltage of the power supply circuit 1 with the output voltage of the differential amplifier 24, a flip-flop 28 connected to the output terminals of the pulse converter 25 and comparing amplifier 26, another flip-flop 29 connected to the output terminals of the pulse converter 25 and comparing amplifier 27, another flip-flop 30 connected to the output terminals of the pulse converter 25, comparing amplifier 26 and flip-flop 28, another flip-flop 31 connected to the output terminals of the pulse converter 25, comparing amplifier 27 and flip-flop 29, a pulse generator 32 for continuously generating a train of pulses having equal pulse intervals, an AND gate 33 connected to the output terminals of the flip-flop 30 and pulse generator 32, another AND gate 34 connected to the output terminals of the flip-flop 31 and pulse generator 32, and a driving amplifier 35 for amplifying the pulse output of the AND gate 33 or 34 and instructing the direction of rotation of the pulse motor 3a.

The operation of the power supply system of the present invention having such a structure will be described with reference to FIGS. 1, 2 and 3. In this operation, it is supposed that a single-phase a.c. voltage is converted into a ⅓-phase a.c. voltage which is rectified to obtain an output waveform this output voltage is reduced to a predetermined level.

In operation, the 1:n pulse dividers 16 and 17 are set to divide the number of input pulses into one-third of the original number. A single-phase a.c. voltage having a waveform as shown in FIG. 2A is applied across the input terminals 2 of the power supply circuit 1. This single-phase a.c. voltage is applied to the slide regulator 3 to be reduced to a lower level. This reduced voltage is further reduced to the level of the working voltage by the transformer 4 and the output of the transformer 4 is applied to the rectifier elements 5 and 6.

A portion of the single-phase a.c. voltage appled across the input terminals 2 is branched to be applied to the pulse converter 11 and wave shaper 12. The pulse converter 11 converts the a.c. input into a train of pulses as shown in FIG. 2B and applies these pulses to the AND gates 14 and 15. The wave shaper 12 shapes the a.c. input into a rectangular waveform as shown in FIG. 2C and applies this rectangular waveform to the AND gate 14 and inverter 13. The inverter 13 inverts the input and applies a rectangular waveform as shown in FIG. 2D to the AND gate 15. Output pulses appear from the AND gates 14 and 15 only when the rectangular waveform input is in the high level. Thus, the number of pulses applied to the AND gates 14 and 15 is divided into one-half of the original number as shown in FIGS. 2E and 2F, and such pulses are applied to the 1:n pulse dividers 16 and 17. The divider 16 divides the number of input pulses applied from the AND gate 14 into ⅓ as it is a ⅓ pulse divider, and pulses as shown in FIG. 2G are applied from the divider 16 to the 1:n pulse divider 17 and pulse amplifier 18. The divider 17, which is also a ⅓ pulse divider, divides the number of input pulses applied from the AND gate 15 into ⅓ with the timing dictated by the pulses applied from the divider 16, and pulses as shown in FIG. 2H are applied from the divider 17 to the pulse amplifier 19. The pulse amplifers 18 and 19 amplify the applied pulses into waveforms as shown in FIGS. 2I and 2J respectively, and these waveforms are applied to the gate terminals 5a and 6a of the respective rectifier elements 5 and 6 as a gating signal.

Due to the fact that the single-phase a.c. voltage having a waveform as shown in FIG. 2A is applied to the rectifier elements 5 and 6, rectifier waveforms as shown in FIGS. 2K and 2L appear from the respective rectifier elements 5 and 6 in response to the application of the gating signal. The waveforms shown in FIGS. 2K and 2L are then combined to provide a rectified waveform as shown in FIG. 2M in which it will be seen that the single-phase a.c. voltage is converted into a ⅓-phase voltage waveform. This waveform appears across the output terminals 8 of the power supply circuit 1.

An input applied to the input terminal 22 is changed into a desired reference voltage by the resistor 21 and such voltage is applied to the differential amplifier 24 and comparing amplifier 26. The resistor 23 establishes a voltage corresponding to the dead zone having a predetermined range and such voltage is applied to the differential amplifier 24. The output of the differential amplifier 24 is representative of the difference between the voltages applied from the resistors 21 and 23 and is applied to the comparing amplifier 27. The working voltage having a waveform as shown in FIG. 3M is detected across the dummy load 7 to be applied to the pulse converter 25 and comparing amplifiers 26 and 27. In response to the application of the voltage waveform shown in FIG. 3M, the pulse converter 25 generates a train of pulses as shown in FIG. 3N and applied same to the flip-flops 28, 29, 30 and 31. The comparing amplifier 26 compares the output voltage of the power supply circuit 1 with the reference voltage applied from the resistor 21, and as a result, an output as shown in FIG. 3O appears therefrom to be applied to the flip-flop 28. The flip-flop 28 delivers an output as shown in FIG. 3P in which it will be seen that the level of the output varies each time a pulse is applied from the pulse converter 25 and the output varies from the high to the low level when the output of the comparing amplifier 26 is in the low level. Such output of the flip-flop 28 is applied to the flip-flop 30. The flip-flop 30 delivers an output as shown in FIG. 3Q in which it will be seen that the output varies from the low to the high level when the output of the comparing amplifier 26 is in the low level and the output varies from the high to the low level when the output of the flip-flop 28 is in the high level and the output of the pulse converter 25 varies from the high to the low level. Such output of the flip-flop 30 is applied to the AND gate 33 to which a train of pulses as shown in FIG. 3R are continuously applied from the pulse generator 32, so that these pulses can pass through the AND gate 33 only when the output of the flip-flop 30 is in the high level. Thus, a train of pulses as shown in FIG. 3S appear from the AND gate 33 to be applied to the driving amplifer 35. The driving amplifier 35 senses the polarity of the pulses applied thereto and amplifies the pulses to the level high enough to drive the pulse motor 3a, the amplified output being applied to the pulse motor 3a. In response to the application of the signal from the driving amplifier 35, the pulse motor 3a rotates to actuate the slide regulator 3 for reducing the output voltage so as to control the working voltage to a constant value. When the output voltage of the power supply circuit 1 is lower than the reference voltage, the output voltage is increased by the combination including the comparing amplifier 27, flip-flops 29 and 30 and AND gate 34 so as to control the working voltage to the constant value in a manner similar to that above described.

An electrolytic grinding apparatus equipped with the power supply system according to the present invention was used to grind workpieces under the following conditions:

1. Grinding wheel: Graphite grinding wheel having an outer diameter of 200 mm
2. Number of revolutions: 5,000 rpm
3. Electrolyte: 20 % aqueous solution of $N_aNO_3$ and 0.5 % aqueous solution of $NaNO_2$ 4. Working voltage waveform: ⅓ phase
5. Peak voltage: 6 volts
6. Material of workpieces: SKH57 and SKD11

The surface roughness of the ground workpieces was less than 1 μ and precision of grinding was of the order of ± 0.005 mm. Thus, the workpieces could be ground with high precision.

What we claim is:

1. A power supply system for an electrolytic grinding apparatus comprising:
    a power supply circuit for lowering an a.c. voltage of a commercial frequency to a working voltage level and rectifying the lowered voltage to obtain a d.c. voltage having a pulsating waveform as an output, which constitutes the working voltage;
    a phase reducing circuit for setting the repetition frequency of said d.c. output voltage waveform in synchronism with said a.c. voltage; and
    a voltage control circuit for comparing said d.c. output voltage with a predetermined reference voltage and controlling the peak value of said d.c. output voltage to a predetermined level.

2. A power supply system for an electrolytic grinding apparatus comprising:
    a power supply circuit for receiving an a.c. voltage of a commercial frequency and converting said a.c. voltage to a predetermined working voltage, said power supply circuit including a variable voltage converting circuit for reversibly controlling the level of said working voltage, and rectifier means having a gate terminal for rectifying an output of said variable voltage converting circuit and delivering the rectified output of the power supply circuit as said working voltage;
    a phase reducing circuit for producing control pulses having a repetition frequency no higher than that of a single-phase half-wave rectified waveform of said a.c. voltage and applying said control pulses to said gate terminal of said rectifier means; and
    a voltage control circuit for comparing the output of said rectifier means with a predetermined reference voltage and controlling said variable voltage converting circuit in accordance with the difference therebetween, thereby reversibly controlling the level of said working voltage.

3. A power supply system for an electrolytic grinding apparatus comprising:
    a power supply circuit including a variable voltage converting circuit having an input terminal and an output terminal for lowering an a.c. voltage of a commerical frequency to a working voltage level, rectifier means having a gate terminal for rectifying an output current delivered at the output terminal of said variable voltage converting circuit to a d.c. current, and a dummy load for detecting an output voltage of said rectifier means, which constitutes the working voltage;
    a phase reducing circuit receiving said a.c. voltage shunted from the input terminal of said variable voltage converting circuit for producing a gate signal to be applied to said gate terminal of said rectifier means;
    a voltage control circuit for comparing said detected output voltage of said rectifier means with a predetermined reference voltage and controlling said variable voltage converting circuit in accordance with the difference therebetween, thereby reversibly controlling the level of said working voltage.

4. A power supply system according to claim 3, in which said phase reducing circuit comprises:
    a pulse converting circuit connected to said input terminal of said variable voltage converting circuit for receiving said shunted a.c. voltage and converting said a.c. voltage to a train of pulses;
    a wave shaping circuit connected in parallel with said pulse converting circuit for shaping said a.c. voltage into a rectangular waveform;
    an AND gate circuit connected to said pulse converting circuit and said wave shaping circuit for deriving a first train of pulses having the number of pulses equal to one half of that of pulses of the original pulse train;
    another AND gate circuit connected to said pulse converting circuit and to said wave shaping circuit through an inverter circuit for deriving a second train of pulses, in one half period delay with respect to the first pulse train, having the number of pulses equal to one half of that of the original pulse train;
    pulse divider circuits connected to said two AND gate circuits, respectively, for dividing the number of pulses of said first and second pulse trains into a predetermined number; and
    pulse amplifier circuits connected to said pulse divider circuits, respectively, for producing said gate signal to be applied to said gate terminal of said rectifier means.

5. A power supply system according to claim 3, in which said voltage control circuit comprises:
    a first resistor for setting said predetermined reference voltage;
    a second resistor connected in parallel with said first resistor for establishing a dead zone having a predetermined range to said reference voltage;
    a differential amplifier circuit connected to said first and second resistors;
    a comparing amplifier circuit for comparing said output voltage detected through said dummy load with said reference voltage;
    another comparing amplifier circuit for comparing said detected output voltage with an output of said differential amplifier circuit;
    a pulse converting circuit for converting said detected output voltage to a pulse signal;
    first flip-flop circuits connected to said pulse converting circuit and connected respectively to said comparing amplfier circuits;
    second flip-flop circuits connected to said pulse converting circuit and connected respectively to said comparing amplifier circuits, said second flip-flop circuits receiving outputs of said first flip-flop circuits respectively;
    a pulse generator for always producing pulses;
    AND gate circuits connected to said pulse generator and connected respectively to said second flip-flop circuits; and
    a driving amplifier circuit connected to said AND gate circuits for amplifying outputs of said AND gate circuits and controlling said variable voltage converting circuit of said power supply circuit.

6. A power supply system for an electrolytic grinding apparatus comprising:
    a power supply circuit for lowering an a.c. voltage of a commercial frequency to a working voltage level and rectifying the lowered voltage to obtain a d.c. voltage having a pulsating waveform as an output, which constitutes the working voltage;

a phase reducing circuit for controlling the rectification timing in said power supply circuit for providing a repetition frequency no higher than that of a single-phase half-wave rectified waveform of said a.c. voltage to the waveform of said output of said power supply circuit; and a voltage control circuit for controlling the lowering rate in said power supply circuit in accordance with the difference between said d.c. voltage and a predetermined reference voltage.

7. A power supply system for an electrolytic grinding apparatus comprising:

a power supply circuit for generating a working voltage including a variable voltage convering circuit having an input terminal and an output terminal for lowering an a.c. voltage of a commercial frequency to a predetermined working voltage level, and rectifier means having a gate terminal for rectifying an output current delivered at the output terminal of said variable voltage converting circuit, whereby said working voltage is generated having a pulsating waveform;

a phase reducing circuit receiving said a.c. voltage shunted from the input terminal of said variable voltage converting circuit for producing a gate signal to be applied to said gate terminal of said rectifier means, thereby providing, to the waveform of said working voltage, a repetition frequency no higher than that of a single-phase half-wave rectified waveform of said a.c. voltage; and a voltage control circuit for comparing a peak value of said working voltage detected from said power supply circuit with a predetermined reference voltage and controlling said variable voltage converting circuit of said power supply circuit in accordance with the difference therebetween, thereby reversibly controlling the level of said working voltage.

* * * * *